United States Patent Office 3,212,969
Patented Oct. 19, 1965

3,212,969
16-METHYL-19-NOR-$\Delta^{4,6}$-PREGNADIENE-
3,20-DIONE
Albert Bowers, Mexico City, Mexico, assignor to Syntex Corporation, Panama, Panama, a corporation of Panama
No Drawing. Filed Nov. 9, 1962, Ser. No. 236,740
Claims priority, application Mexico, Nov. 17, 1961, 65,067
12 Claims. (Cl. 167—58)

The present invention relates to novel cyclopentanophenanthrene derivatives, to processes for the production thereof and to certain hormonal therapeutic compositions possessing progestational and antiestrogenic activity both in animals and humans by the oral route.

More particularly the present invention has among its objects the novel $\Delta^6$-dehydro-19-nor-progesterone, the 16-methyl derivatives thereof, certain processes for their preparation, certain novel compositions of progestational activity including the latter compounds and the process of administration of such compositions in the animal and human clinic.

The novel compounds of the present invention are represented by the following formula:

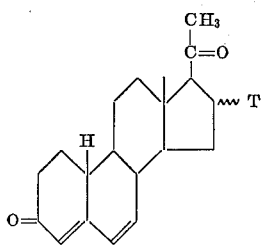

In the above formula T represents hydrogen, α-methyl or β-methyl.

The novel compounds represented by the above formula are very potent anti-estrogenic and progestational agents useful in control of fertility, and have remarkable activity when administered by the oral route, thus greatly simplifying the treatment of patients who are in a state of enhanced sensitiveness and mental agitation and often exhibit exaggerated reluctance to parenteral treatment.

In accordance with the present invention, the oral activity of the above compounds facilitates the administration of progestational agents in cases where parenteral treatment of each individual is difficult; for example, when control of moulting in poultry is desired, the feed may be mixed with a compound represented by the above formula, thus assuring a uniform distribution among all the animals. Furthermore, when control of ovulation of wild or semi-wild female animals is convenient, in order to diminish their fertility and, therefore, the number of births, as in cases where agricultural areas become infested with deer, rabbits or other rodents, there may be used with success mixtures of a compound of the present invention with suitable feed placed in spots easily reached by these animals. The compounds are also useful for the control of female dogs so as to prevent heat during dog shows and field trials.

Compositions containing $\Delta^6$-dehydro-19-nor-progesterone or a 16-methyl derivative thereof, are useful in the treatment of diseases associated with the increase of estrogens in the female, especially in mastitis, dysmenorrhea, acne, endometriosis, etc. and of disorders caused by progestational deficiency, such as certain types of miscarriage.

The administration of such compositions in precise doses contained in conventional unit dosage types is convenient for strict control of the amonuts of active substance and enables variation or alternation with placebos for diagnostic observation.

The "unit dosages" referred to hereinbefore, are pharmaceutical forms containing a certain amount of active material necessary to produce a desired therapeutic effect.

Examples of unit dosages in solid form are: tablets, capsules, pills, powder packets, laminated pills or tables and the like.

In the case of liquid compositions such as solutions, emulsions, syrups, etc., the "unit dosage" is a teaspoonful or a tablespoonful.

The orally active $\Delta^6$-dehydro-19-nor-progesterone and 16-methyl derivatives thereof, may be employed alone or in mixtures with other coacting compounds. They may be associated with solid or liquid carriers, in solutions, dispersions or suspensions.

For preparing solid compositions, e.g. tablets, there may be included conventional tableting ingredients, such as corn starch, lactose, talc, stearic acid, magnesium stearate, calcium stearate, gums and the like. Any other compatible, edible, tableting material used in pharmaceutical practice may be employed.

The novel compositions of the present invention may also include the active material in the form of laminated or coated tablets or pills, e.g. the active hormone may be contained in the core of the pill or tablet enveloped by a layer which may include hormones with similar or different activities or other substances such as analgesics, sedatives or anti-spasmodics. Moreover, the layers may be separated by an additional enteric layer, made of conventional materials such as mixtures containing shellac and edible substances, cellulose phthalate, starch and amylose acetate phthalate, and the like, thus making possible the absorption of the outer coating in the stomach and the core in the duodenum. This form of administration enables a more prolonged absorption period if active hormone is included in the outer and inner portions of the pill or tablet.

The preferred compositions in accordance with the present invention are those prepared for administration in unit dosage form.

In accordance with the present invention the surprising discovery has been made that the introduction of $\Delta^6$-double bond into the molecule of a 19-nor-$\Delta^4$-pregnene derivative enhances its oral progestational activity, for example $\Delta^6$-dehydro-19-nor-progesterone is six times more active orally than 19-nor-progesterone.

It has been found that the convenient oral unit dosage of $\Delta^6$-dehydro-19-nor-progesterone or the 16-methyl derivatives thereof, may vary between 1 and 25 mg. of a single compound daily per 50 kilos mammalian body weight. However higher or lower doses are also practical depending upon the severity or degree of the illness. In those cases where a minimum response is desired, there are preferably employed doses of approximately 1 to 10 mg. daily.

The compounds of the present invention may also be used in sequential treatments associated with an estrogenic agent, in order to control the fertility in the mammalian female for example in the women there are administered daily from 60 to 100γ preferably 80γ of the 3-methyl ether of 17-ethinyl estradiol during approximately the 5th to the 14th day, inclusive, of the menstrual cycle, then to the same estrogen is added a daily dose of 5 to 25 mg. of $\Delta^6$-dehydro-19-nor-progesterone during approximately the 15th to the 24th day, inclusive.

Instead of the 3-methyl ether of 17-ethinyl estradiol, there may also be used other estrogenic agents such as estradiol, estriol, benzestral, hexestrol, promethestrol, and the like.

The novel compounds of the present invention may be prepared in accordance with the following scheme:

3,20-diketo-19-oic acids (VI). The latter compounds are decarboxylated upon treatment with a mineral acid thus furnishing the corresponding 19-nor-$\Delta^{4,6}$-pregnadiene-3,20-diones (VII).

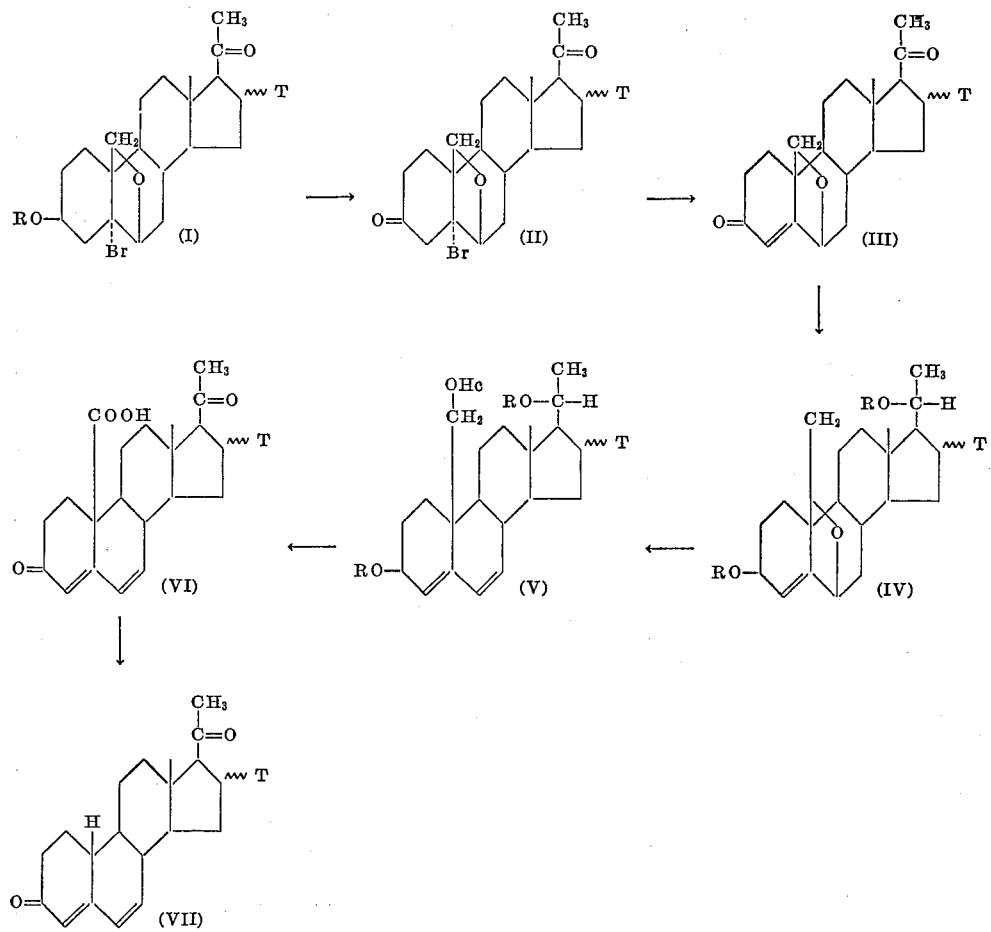

In the above formula T has the same meaning as described hereinbefore; R may be hydrogen or a hydrocarbon carboxylic acyl group of less than 12 carbon atoms.

In practicing the process outlined above, the starting compound (I; R=Acyl) which is a 5α-bromo-6β,19-oxido-pregnan-3β-ol-20-one acylate derivative is hydrolyzed in a mild basic medium, as for example potassium carbonate solution, thus affording the corresponding free-alcohol (I; R=H) which upon oxidation, preferably with chromic acid yields the corresponding 5α-bromo-3-ketone (II). When treating the latter 5α-bromo-3-ketone (II) with a weak base such as sodium acetate in a suitable solvent, e.g. methanol, there is produced the corresponding 6β,19-oxido-$\Delta^4$-pregnene-3,20-dione (III).

The ketone groups of the compounds represented by Formula III are reduced, preferably with lithium aluminum hydride, thus giving the corresponding 3β,20β-diols (IV; R=H) which are conventionally acylated in pyridine, to produce the corresponding diacylates (IV; R=Acyl).

The latter compounds are treated with boron trifluoride etherate in acetic anhydride thus yielding the 3,20-diacyloxy-19-acetoxy-$\Delta^{4,6}$-derivatives (V; R=Acyl), which after treatment with a weak base such as potassium carbonate in order to saponify the acyloxy groups, and oxidation, preferably with chromic acid, yield the corresponding $\Delta^{4,6}$-

The novel compounds of the present invention, may also be produced by the process illustrated by the following scheme:

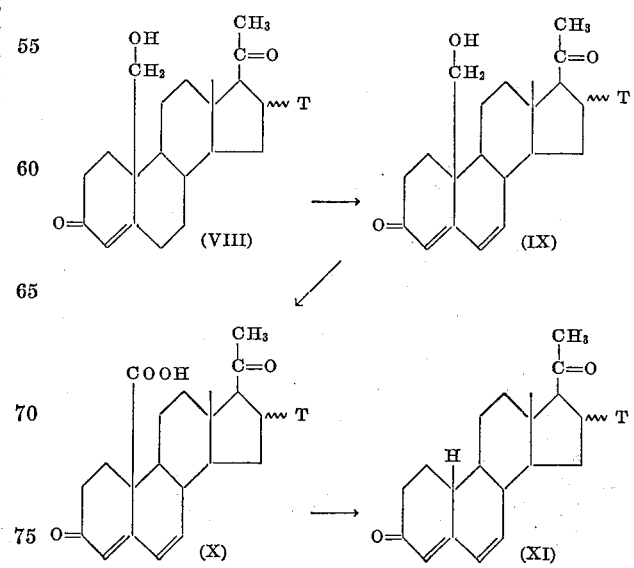

In the above formulae T has the same meaning as heretofore.

In practicing the process just outlined, the starting compound (XIII), which is a 19-hydroxy progesterone derivative, is treated with a benzoquinone with an oxidation potential of less than —0.5 v., for example it is treated with 2,3-dichloro-5,6-dicyano-1,4-benzoquinone in the presence of a strong acid, preferably a mineral acid, such as hydrogen chloride, for a period of time of the order of 100 minutes, preferably at room temperature, or with chloranil in a high boiling point solvent, such as to-butanol, preferably at reflux temperature for about 8 hours, thus affording the corresponding 19-hydroxy-$\Delta^6$-dehydro-progesterone compound (IX). The 19-hydroxyl group of the latter compound is oxidized preferably with chromium trioxide, thus affording the corresponding $\Delta^{4,6}$-pregnadiene-3,20-dione-19-oic acid (X) which is decarboxylated by treatment with a mineral acid, to produce the corresponding 19-nor-$\Delta^{4,6}$-pregnadiene-3,20-dione (XI).

The following specific examples serve to illustrate, but are not intended to limit the scope of the present invention:

Example I

A suspension of 3 g. of the acetate of 5α-bromo-6β,19-oxido-pregnan-3β-ol-20-one (obtained in accordance with copending patent application Serial No. 236,724, filed November 9, 1962, or as described in U.S. Patent No. 3,065,228 to Bowers) in 180 cc. of methanol was treated with a solution of 3 g. of potassium carbonate in 18 cc. of water; the mixture was boiled under reflux for 1 hour and then cooled in ice and diluted with water. The formed precipitate was collected and by recrystallization from acetone-hexane yielded 5α-bromo-6β,19-oxido-pregnan-3β-ol-20-one (compound No. 1).

By the same procedure, the acetate of 16α-methyl-5α-bromo-6β,19-oxido-pregnan-3β-ol-20-one and the acetate of 16β-methyl-5α-bromo-6β,19-oxido-pregnan-3β-ol - 20-one (obtained according to the aforesaid application) were respectively converted into: 16α-methyl-5α-bromo-6β,19-oxido-pregnan-3β-ol-20-one (Compound No. 2) and 16β-methyl-5α-bromo-6β,19-oxido-pregnan-3β - ol - 20 - one (Compound No. 3).

Example II

A solution of 2 g. of 5α-bromo-6β,19-oxido-pregnan-3β-ol-20-one in 20 cc. of acetone was cooled to 0° C. and treated under an atmosphere of nitrogen and with stirring with a solution of 8 N chromic acid (prepared by mixing 26 g. of chromium trioxide with 23 cc. of concentrated sulfuric acid and diluting with water to 100 cc.) until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 5α-bromo-6β,19-oxido-pregnane-3,20-dione (Compound No. 4).

The compounds Nos. 2 and 3 were converted by the same technique, respectively, into: 16α-methyl-5α-bromo-6β,19-oxido-pregnane-3,20-dione (Compound No. 5) and 16β-methyl-5α-bromo-6β,19-oxido-pregnane-3,20 - dione (Compound No. 6).

Example III

A mixture of 2 g. of 5α-bromo-6β,19-oxido-pregnane-3,20-dione (Compound No. 4), 2 g. of sodium acetate and 100 cc. of methanol was boiled under reflux for 15 minutes. It was then poured into water and the formed precipitate was filtered, dried and recrystallized from acetone-hexane, thus giving 6β,19-oxido-$\Delta^4$-pregnene-3,20-dione (Compound No. 7).

The compounds Nos. 5 and 6 were treated according to the above procedure, thus yielding respectively 16α-methyl-6β,19-oxido-$\Delta^4$-pregnene-3,20 - dione (Compound No. 8) and 16β-methyl-6β,19-oxido-$\Delta^4$-pregnene - 3,20-dione (Compound No. 9).

Example IV

A solution of 1 g. of 6β,19-oxido-$\Delta^4$-pregnene-3,20-dione (Compound No. 7) in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 6β,19-oxido-$\Delta^4$-pregnene-3β,20β-diol (Compound No. 10).

By the above procedure, the compounds Nos. 8 and 9, were respectively converted into: 16α-methyl-6β,19-oxido-$\Delta^4$-pregnene-3β,20β-diol (Compound No. 11) and 16β-methyl-6β,19-oxido-$\Delta^4$-pregnene-3β,20β-diol (Compound No. 12).

Example V

A mixture of 1 g. of 6β,19-oxido-$\Delta^4$-pregnene-3β,20β-diol, 4 cc. of pyridine and 2 cc. of acetic anhydride was kept at room temperature overnight, poured into ice water, the formed precipitate was filtered, washed with water and dried. Crystallization from acetone-hexane gave the diacetate of 6β,19-oxido-$\Delta^4$-pregnene-3β,20β-diol (Compound No. 13).

In the same manner, the compounds Nos. 11 and 12 were respectively converted into: the diacetate of 16α-methyl-6β,19-oxido-$\Delta^4$-pregnene-3β,20β-diol (Cpd. No. 14) and the diacetate of 16β-methyl-6β,19-oxido-$\Delta^4$-pregnene-3β,20β-diol (Cpd. No. 15).

Example VI

A mixture of 3 g. of the diacetate of 6β,19-oxido-$\Delta^4$-pregnene-3β,20β-diol, 4 cc. of acetic anhydride and 3 drops of an ether solution of boron trifluoride, was maintained at 0° C. for 30 minutes. Then it was poured into water and the formed precipitate washed to neutral, dried and recrystallized from acetone, thus giving the triacetate of $\Delta^{4,6}$-pregnadiene-3β,19,20β-triol (Cpd. No. 16).

When applying the same procedure to compounds Nos. 14 and 15, there were respectively obtained: the triacetate of 16β-methyl-$\Delta^{4,6}$-pregnadiene-3β,19,20β-triol (Cpd. No. 17) and the triacetate of 16β-methyl-$\Delta^{4,6}$-pregnadiene-3β, 19,20β-triol (Cpd. No. 18).

Example VII

A suspension of 2.5 g. of the triacetate of $\Delta^{4,6}$-pregnadiene-3β,19,20β-triol (Cpd. No. 16) in 160 cc. of methanol was treated with a solution of 2 g. of potassium carbonate in 12 cc. of water; the mixture was boiled under reflux for 1 hour and then cooled in ice and diluted with water. The formed precipitate was collected and by recrystallization from acetone-hexane yielded $\Delta^{4,6}$-pregnadiene-3β,19,20β-triol (Cpd. No. 19).

The compounds Nos. 17 and 18 were treated by the above procedure, thus affording respectively: 16α-methyl-$\Delta^{4,6}$-pregnadiene-3β,19,20β-triol (Cpd. No. 20) and 16β-methyl-$\Delta^{4,6}$-pregnadiene-3β,19,20β-triol (Cpd. No. 21).

Example VIII

A solution of 2 g. of $\Delta^{4,6}$-pregnadiene-3β,19,20β-triol in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture for 10 minutes. It was stirred for 5 minutes further at 0–5° C. and diluted with water. The precipitate was collected, washed with water and dried under vacuum, thus affording a crude product which upon recrystallization from acetone-hexane gave $\Delta^{4,6}$-pregnadiene-3,20-dione-19-oic acid (Cpd. No. 22).

By the same procedure, the compounds Nos. 20 and 21, were respectively converted into 16α-methyl-$\Delta^{4,6}$-pregnadiene-3,20-dione-19-oic acid (Cpd. No. 23) and 16β-methyl-$\Delta^{4,6}$-pregnadiene-3,20-dione-19-oic acid (Cpd. No. 24).

*Example IX*

A mixture of 1.5 g. of $\Delta^{4,6}$-pregnadiene-3,20-dione-19-oic acid, 75 cc. of methanol and 2 cc. of concentrated hydrochloric acid was heated on a steam bath for 30 minutes. Then it was cooled and poured into ice water, the formed precipitate was filtered, washed and dried. Upon crystallization from acetone-hexane there was obtained 19-nor-$\Delta^{4,6}$-pregnadiene-3,20-dione (Cpd. No. 25).

The compounds Nos. 23 and 24 were treated by the same procedure, thus affording respectively: 16α-methyl-19-nor-$\Delta^{4,6}$-pregnadiene-3,20-dione (Cpd No. 26), and 16β-methyl-19-nor-$\Delta^{4,6}$-pregnadiene-3,20-dione (Cpd. No. 27).

*Example X*

Through a solution of 3 g. of 19-hydroxy-progesterone in 200 cc. of anhydrous dioxane was passed a current of dry hydrogen chloride during 15 minutes, at room temperature; there were then added 2.8 g. of 2,3-dichloro-5,6-dicyano-1,4-benzoquinone and dry hydrogen chloride was further passed for 45 seconds. The reaction mixture was kept at room temperature for 90 minutes, the formed hydroquinone was filtered off and the filtrate was diluted with methylene chloride. The resulting solution was washed with 1% aqueous potassium hydroxide solution till the washings were colorless, with water to neutral, dried over anhydrous sodium sulfate and evaporated to dryness. The residue was recrystallized from ethyl acetate, thus yielding 19-hydroxy-$\Delta^6$-dehydro-progesterone (compound No. 28). 16α-methyl-19-hydroxy-progesterone and 16β-methyl-19-hydroxy-progesterone (obtained from the corresponding 19-hydroxy pregnenolones, by treatment under Oppenauer conditions for approximately 15 minutes, as described in my copending U.S. patent application Ser. No. 201,802, filed June 12, 1962, were treated by the same procedure, thus yielding respectively: 16α-methyl-19-hydroxy-$\Delta^6$-dehydroprogesterone (Cpd. No. 29) and 16β-methyl-19-hydroxy-$\Delta^6$-dehydroprogesterone (Cpd. No. 30).

*Example XI*

A mixture of 1 g. of 19-hydroxy-progesterone, 2 g. of chloranil and 50 cc. of terbutanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with 2 cc. of alumina, gave 19-hydroxy-$\Delta^6$-dehydroprogesterone (Cpd. No. 28) identical with product obtained in Example X.

*Example XII*

The compounds Nos. 28, 29 and 30 were treated according to Example VIII, thus affording compounds identical, respectively, with: $\Delta^{4,6}$-pregnadiene-3,20-dione-19-oic acid (Cpd. No. 22), 16α-methyl-$\Delta^{4,6}$-pregnadiene-3,20-dione-19-oic acid (Cpd. No. 23), and 16β-methyl-$\Delta^{4,6}$-pregnadiene-3,20-dione-19-oic acid (Cpd. No. 24).

When the produced compounds were subjected to the conditions of Example IX, there were respectively obtained compounds identical with compounds Nos. 25, 26, and 27.

*Example XIII*

Pharmaceutical preparation containing $\Delta^6$-dehydro-19-nor-progesterone (19-nor-$\Delta^{4,6}$-pregnadiene-3,20-dione) in the form of tablets.

One thousand tablets, each containing approximately 10 mg. of $\Delta^6$-dehydro-19-nor-progesterone are prepared from the following types and amounts of materials:

| | G. |
|---|---|
| $\Delta^6$-dehydro-19-nor-progesterone | 10.25 |
| Lactose, U.S.P. | 93.00 |
| Polyvinylpyrrolidone | 6.00 |
| Corn starch, U.S.P. | 44.00 |
| Magnesium stearate, U.S.P. | 7.00 |
| | 150.25 |

The finely powdered $\Delta^6$-dehydro-19-nor-progesterone, lactose, polyvinylpyrrolidone and corn starch are mixed well, preferably with trituration, till a homogeneous powder is formed. This powder is moistened with 37 cc. of ethanol and the humid mixture is passed through a No. 8 or 10 sifter, thereafter being granulated by usual procedures. The granules are dried at 50° C. for 4.5 hours, then mixed with magnesium stearate and the final mixture is compressed into 150 mg. tablets containing approximately 10 mg. of active substance.

In the same manner there are prepared tablets with 16α-methyl-$\Delta^6$-dehydro-19-nor-progesterone or the 16β-isomer thereof as active hormone.

*Example XIV*

The method described in the foregoing example for preparing tablets with 10 mg. of active material was repeated, but there were only added 5 mg. of $\Delta^6$-dehydro-19-nor-progesterone for each tablet, i.e. 5 g. for each thousand tablets.

*Example XV*

The Example IX was repeated, except that in lieu of hydrochloric acid there was used sulfuric acid, thus giving the same products.

*Example XVI*

The Example X was repeated, except that hydrogen chloride was substituted by sulfuric acid, with exactly the same results.

I claim:
1. 16α-methyl-19-nor-$\Delta^{4,6}$-pregnadiene-3,20-dione.
2. 16β-methyl-19-nor-$\Delta^{4,6}$-pregnadiene-3,20-dione.
3. A process for the production of a compound selected from the group consisting of 19-nor-$\Delta^{4,6}$-pregnadiene-3,20-dione and the 16α-methyl and 16β-methyl derivatives thereof which comprises treating the corresponding 5α-bromo-6β,19-oxidopregnan-3β-ol-20-one acylate in a mild basic medium, oxidizing the thus-produced 3-alcohol with chromic acid, treating the thus-obtained 5α-bromo-3-ketone with a weak base, reducing the thus-produced 6β,19-oxido-$\Delta^4$-pregnene-3,20-dione with lithium aluminum hydride, acylating the thus-obtained 3β,20β-diol in pyridine under conventional conditions, treating the thus-obtained diacylate with acetic anhydride in the presence of boron trifluoride etherate, treating the thus-obtained 3,20-diacyloxy-19-hydroxy-$\Delta^{4,6}$-pregnadiene with a weak base, oxidizing the thus-produced triol with chromic acid, and decarboxylating the thus-obtained $\Delta^{4,6}$-pregnadiene-3,20-dione-19-oic acid with a mineral acid.

4. A process for the production of a compound selected from the group consisting of 19-nor-$\Delta^{4,6}$-pregnadiene-3,20-dione and the 16α-methyl and 16β-methyl derivatives thereof which comprises treating the corresponding 19-hydroxy progesterone with a benzoquinone with an oxidation potential of less than −0.5 v., oxidizing the thus-produced 19-hydroxy-$\Delta^6$-dehydro-progesterone with chromium trioxide, and decarboxylating the thus-obtained $\Delta^{4,6}$-pregnadiene-3,20-dione-19-oic acid with a mineral acid.

5. The process of claim 3 wherein the mild basic medium is potassium carbonate solution, the first weak base is sodium acetate in methanol, the second weak base is calcium carbonate and the mineral acid is hydrochloric acid.

6. The process of claim 4 wherein the benzoquinone is 2,3-dichloro-5,6-dicyano-1,4-benzoquinone.

7. The process of claim 4 wherein the benzoquinone is chloranil.

8. The process of claim 4 wherein the mineral acid is hydrochloric acid.

9. The process of claim 6 wherein the treatment with a benzoquinone is effected in the presence of a mineral acid.

10. The process of claim 9 wherein the mineral acid is hydrogen chloride.

11. A pharmaceutical composition comprising the combination of a suitable solid pharmaceutical carrier and 16-methyl-19-nor-$\Delta^{4,6}$-pregnadiene-3,20-dione.

12. 16-methyl-19-nor-$\Delta^{4,6}$-pregnadiene-3,20-dione.

References Cited by the Examiner

UNITED STATES PATENTS

| | | | |
|---|---|---|---|
| 3,039,926 | 6/62 | Shull | 167—65 |
| 3,050,534 | 8/62 | Bowers et al. | 260—397.3 |

OTHER REFERENCES

Bowers et al.: Jour. Amer. Chem. Soc., August 20, 1962, pages 3204–3205.

LEWIS GOTTS, *Primary Examiner.*